(12) United States Patent
Minami et al.

(10) Patent No.: US 8,510,258 B2
(45) Date of Patent: Aug. 13, 2013

(54) INFORMATION PROCESSING APPARATUS, INFORMATION PROCESSING METHOD, AND PROGRAM FOR EXTRACTING INFORMATION FROM AN ELECTRONIC PROGRAM GUIDE

(75) Inventors: Setsushi Minami, Tokyo (JP); Naoki Kamimaeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 253 days.

(21) Appl. No.: 13/014,238

(22) Filed: Jan. 26, 2011

(65) Prior Publication Data

US 2011/0191360 A1  Aug. 4, 2011

(30) Foreign Application Priority Data

Feb. 2, 2010   (JP) ................................ P2010-021370

(51) Int. Cl.
*G06F 7/00* (2006.01)
*G06F 17/00* (2006.01)
*G06F 17/30* (2006.01)

(52) U.S. Cl.
USPC ......................................... 707/602; 707/758

(58) Field of Classification Search
None
See application file for complete search history.

(56) References Cited

U.S. PATENT DOCUMENTS

| | | | |
|---|---|---|---|
| 2002/0056106 A1 | 5/2002 | Takahashi et al. | |
| 2004/0181527 A1* | 9/2004 | Burdick et al. | 707/6 |
| 2004/0194141 A1* | 9/2004 | Sanders | 725/53 |
| 2007/0074249 A1* | 3/2007 | Byun et al. | 725/39 |
| 2008/0250452 A1* | 10/2008 | Iwamoto | 725/39 |
| 2009/0077067 A1 | 3/2009 | Takagi | |

FOREIGN PATENT DOCUMENTS

| | | |
|---|---|---|
| JP | 11 164223 | 6/1999 |
| JP | 2009 60567 | 3/2009 |

* cited by examiner

*Primary Examiner* — Uyen Le
(74) *Attorney, Agent, or Firm* — Frommer Lawrence & Haug LLP; William S. Frommer; Ellen Marcie Emas (57) ABSTRACT

There is provided an information processing apparatus including: an acquisition unit successively specifying fields to be processed out of a plurality of fields included in program information in electronic program guide information and acquiring a character string included in each specified field; an analysis unit analyzing the acquired character string and outputting an analysis result for dividing the character string into a plurality of units; a sequence generating unit generating, for each field, a sequence corresponding to character string lengths of the units based on the outputted analysis result; a variance value calculating unit calculating, for each field, a variance value showing a degree of variance of magnitudes of values of items in the sequence; and a specifying unit specifying, for each program, a cast member field, in which cast member names are listed, out of the plurality of fields based on the calculated variance values.

9 Claims, 6 Drawing Sheets

Title: "Don't Talk in English!"
ItemName1: "Program Information"
Long Description1: "Pepter's Sushi" Episode 3. "English Speakers aren't all Americans!" Sushi boss Chris Pepter welcomes Japan-based speakers of Indian, Philippine and New Zealand English to his restaurant to demonstrate how words are pronounced in their countries. It's a wake-up call to Japanese viewers who think only American and British English are correct! Learn cool English phrases from the latest pop hits in Music Corner." } 32
ItemName1: "Cast Members"
LongDescription2: "(Cast)Chris Pepter,Ravi Singh,Micky Ramirez,Jason Hill(Hosts)Norito Yajima,Minoru Akai(Voiceover)John Cahira" } 34

INFORMATION PROCESSING APPARATUS, INFORMATION PROCESSING METHOD, AND PROGRAM FOR EXTRACTING INFORMATION FROM AN ELECTRONIC PROGRAM GUIDE

BACKGROUND OF THE INVENTION

1. Field of the Invention

The present invention relates to an information processing apparatus, an information processing method, and a program.

2. Description of the Related Art

In recent years, systems that use an electronic program table called an EPG (Electronic Program Guide) composed of metadata relating to broadcast programs have come into widespread use. For example, EPG information is provided by being transmitted from a broadcaster together with a broadcast wave. EPG information is also provided via the Internet. By using EPG information provided in this way, functions such as changing channel to a program designated by the user on the EPG and reserving a program selected by the user on the EPG for recording are implemented in an apparatus such as a television receiver, a mobile telephone, and a PC (Personal Computer). A function that uses various information included in the EPG information to automatically specify and record programs that the user is likely to enjoy is also realized in a digital recorder.

EPG information is composed of program information relating to a plurality of programs. A plurality of fields are included in the information relating to one program. As one example, a field showing the program title, a field showing the broadcast time of the program, a field in which text showing a summary of the program content is written, and a field in which the cast members of the program are listed are included. Note that for the present specification, the expression "cast member" includes anyone who appears in a program or movie being broadcast, such as an actor, presenter, newsreader, guest, band or musical act, or comic performer. Out of the fields mentioned above, fields provided in EPG information for specific information, such as the program title and the broadcast start time, are decided in advance. On the other hand, fields provided in the EPG information for the cast members of the program, text giving a summary of the program, and the like are not decided. This means that to specify a program in which a particular person appears, it is necessary to first specify the field in which the cast members are listed.

As one example, Japanese Laid-Open Patent Publication No. 2009-60567 discloses an information processing apparatus that carries out morphological analysis on EPG information and compares the analysis result with a specified list pattern of cast member names to efficiently extract information on cast members of programs. As another example, Japanese Laid-Open Patent Publication No. H11-164223 discloses an information processing apparatus that generates data in which identification codes are appended to EPG information by actions carried out by an operator to enable desired information to be identified.

SUMMARY OF THE INVENTION

The list patterns used as conditions for extracting desired information are registered in advance in the apparatus disclosed in Publication No. 2009-60567. With the apparatus disclosed in Publication No. H11-164223, identification codes are assigned to operations by the actions of the operator. That is, with the apparatus disclosed in Publication No. 2009-60567, there is the problem that it is necessary to investigate a priori knowledge in advance, which is troublesome and time consuming. In particular, since this a priori knowledge differs from language to language, it is necessary to investigate different apriori knowledge for each language. With the apparatus disclosed in Publication No. 2009-60567, it is the operator who judges the content of the information, leading to demand for an apparatus that is capable of making such judgments automatically.

The present invention was conceived in view of the problems described above and aims to provide a novel and improved information processing apparatus, information processing method, and program that are capable of specifying a field in an EPG in which names of cast members are listed without using a priori knowledge.

According to an embodiment of the present invention, there is procided an information processing apparatus including an acquisition unit successively specifying fields to be processed out of a plurality of fields included in program information in electronic program guide information and acquiring a character string included in each specified field, an analysis unit analyzing the character string acquired by the acquisition unit and outputting an analysis result for dividing the character string into a plurality of units, a sequence generating unit generating, for each field, a sequence corresponding to character string lengths of the units based on the analysis result outputted by the analysis unit, a variance value calculating unit calculating, for each field, a variance value showing a degree of variance of magnitudes of values of items in the sequence, and a specifying unit specifying, for each program, a cast member field, in which cast member names are listed, out of the plurality of fields based on the variance values calculated by the variance value calculating unit.

According to the above configuration, the information processing apparatus is capable of specifying a cast member field, in which cast member names are listed, from a plurality of fields included in program information that is information on a certain program in EPG information. When doing so, a sequence corresponding to character string lengths of units produced by dividing the character string included in a field is generated and a field with a lowest variance value for values of the items in the sequence is specified as the cast member field. This specifying method has an effect in that unlike an existing method of specifying a cast member field, it is possible to specify a cast member field without using a priori knowledge. Also, with the existing method of specifying the cast member field by matching against a priori knowledge, when a list of cast members is given in a plurality of fields, all of such fields will be extracted. For example, when a list of cast members is included in the text of a program summary field in the program information and a separate cast member field is included in the program information, the existing method will extract both of such fields. On the other hand, the information processing apparatus according to an embodiment of the present invention is able to specify the field out of such fields with the lowest variance value as a single cast member field.

The analysis unit may analyze the character string acquired by the acquisition unit, classifies the respective characters included in the character string in accordance with a specified classification criterion into significant characters and insignificant characters, and outputs a classification result as the analysis result, and the sequence generating unit may calculate a difference sequence for a sequence showing position information of the insignificant characters in the character string using the analysis result to generate the sequence corresponding to the character string lengths of the units.

The acquisition unit may judge whether the size of the character string acquired from a field is within a specified field length range and is operable when the length is within the field length range, to input the character string acquired from the field into the analysis unit.

The specifying unit may specify a lowest variance value that is a lowest value out of the variance values calculated for each field and specifies a field with the lowest variance value as the cast member field.

The specifying unit may specify a lowest variance value that is a lowest value out of the variance values calculated for each field and is operable when the lowest variance value is below a specified judgment threshold, to specify a field with the lowest variance value as the cast member field.

The specifying unit may output success/failure information showing whether specifying of the cast member field succeeded, and the information processing apparatus may further comprise a feedback control unit adjusting the value of the judgment threshold based on the success/failure information outputted by the specifying unit.

After specifying the cast member field, in which cast member names are listed, out of the plurality of fields, the specifying unit may calculate and store a cast member name average length that is an average of the values included in the sequence of the field specified as the cast member field, and specifies the cast member field based on the stored cast member name average length.

According to another embodiment of the present invention, there is provided an information processing method for an information processing apparatus that specifies a cast member field, in which cast member names are listed, from a plurality of fields included in program information in electronic program guide information, including the steps of successively specifying fields to be processed out of a plurality of fields included in the program information in the electronic program guide information and acquiring a character string included in each specified field, analyzing the acquired character string and outputting an analysis result for dividing the character string into a plurality of units, generating, for each field, a sequence corresponding to character string lengths of the units based on the outputted analysis result, calculating, for each field, a variance value showing a degree of variance of magnitudes of values of items in the sequence, and specifying, for each program, a cast member field, in which cast member names are listed, out of the plurality of fields based on the variance values.

According to another embodiment of the present invention, there is provided a program for causing a computer to carry out, a process successively specifying fields to be processed out of a plurality of fields included in the program information in the electronic program guide information and acquiring a character string included in each specified field, a process analyzing the acquired character string and outputting an analysis result for dividing the character string into a plurality of units, a process generating, for each field, a sequence corresponding to character string lengths of the units based on the outputted analysis result, a process calculating, for each field, a variance value showing a degree of variance of magnitudes of values of items in the sequence, and a process specifying, for each program, a cast member field, in which cast member names are listed, out of the plurality of fields based on the variance values.

According to the embodiments of the present invention described above, it is possible to specify a field in which the names of cast members are listed out of an EPG without using a priori knowledge.

DETAILED DESCRIPTION OF THE EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Embodiments of the present invention are described in the order indicated below.
1. First Embodiment
2. Second Embodiment (Example Including Feedback Control)

1. First Embodiment

Functional Configuration

Figure 1:
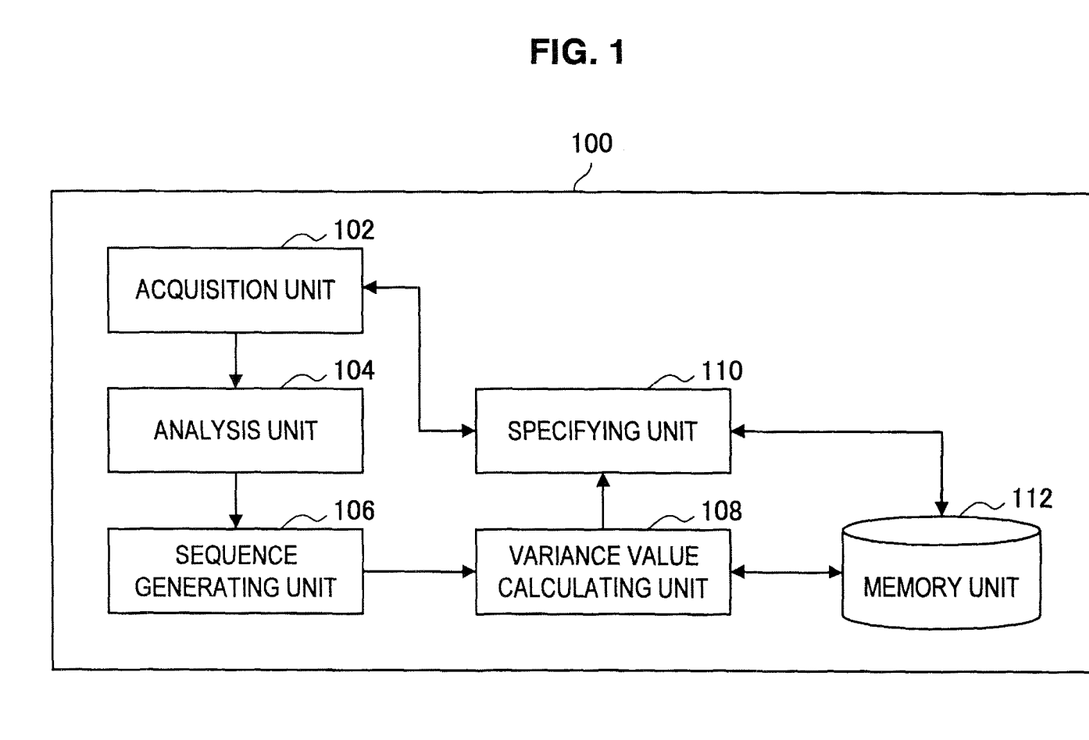
FIG. 1 is a functional block diagram showing an information processing apparatus according to a first embodiment of the present invention.

First, the functional configuration of an information processing apparatus according to a first embodiment of the present invention will be described with reference to FIG. 1. FIG. 1 is a functional block diagram of an information processing apparatus according to the first embodiment of the present invention.

An information processing apparatus 100 according to the present embodiment has a function that obtains EPG information and specifies a cast member field, in which cast member names are listed, out of various fields that are associated with a program included in the EPG information. The information processing apparatus 100 may be a variety of apparatuses, such as a PC, a television set, a mobile telephone, and a PDA.

To realize the function described above, the information processing apparatus 100 mainly includes an acquisition unit 102, an analysis unit 104, a sequence generating unit 106, a variance value calculating unit 108, and a specifying unit 110.

The acquisition unit 102 includes a function that acquires EPG information, successively specifies fields to be processed from a plurality of fields included in the EPG information, and acquires character strings included in the specified fields. The acquisition unit 102 inputs the acquired character strings into the analysis unit 104. Here, the acquisition unit 102 judges whether the size of a character string acquired from a field is within a specified field length range, and when an acquired character string is within the specified field length range, the character string acquired from the field may be inputted into the analysis unit 104. The field length range used here may be decided in advance according to experience based on a range of values that can be taken by the size of the cast member field in which cast member names are listed. As examples, the size of the acquired character string and the field length range may be compared according to character string length or may be compared according to data size. With this configuration, a field that includes a character string whose length is clearly too long to be a character string included in a cast member field is excluded from processing. By doing so, the time taken by analysis, calculation of variance values, and the like is reduced.

The analysis unit 104 has a function that analyzes the character string acquired by the acquisition unit 102 and outputs an analysis result for dividing the character string into a plurality of units. As one example, the analysis unit 104 carries out morphological analysis on the character string acquired by the acquisition unit 102 and classifies the respective characters included in the acquired character string into significant characters and insignificant characters in accordance with a specified classification criterion. The classification result is then inputted into the sequence generating unit 106 as the analysis result. As one example of the classification criterion, the nine characters .,;:( )" "! are set as insignificant characters and all characters aside from the insignificant characters are treated as significant characters. As one example, the analysis unit 104 replaces characters included in the acquired character string that have been classified as significant characters with the value one and replaces characters included in the acquired character string that have been classified as insignificant characters with the value zero.

As one example, consider a case where the character string below has been acquired by the acquisition unit 102.
"(Cast) Snowmobiles,MaryLou,RickyK,Wednesdays,Obsessives,Bite,Sinbads"

In this case, the result of classifying according to the classification criterion given above is expressed by ones and zeros as shown below. The analysis unit 104 inputs this classification result into the sequence generating unit 106 as the analysis result.
00111101111111111011111110111110111111111011 1111111101111011111110

The sequence generating unit 106 has a function for generating, for each field, a sequence corresponding to the character string lengths of units, based on the analysis result inputted by the analysis unit 104. For example, the sequence generating unit 106 uses the analysis result inputted from the analysis unit 104 to generate a sequence showing position information of insignificant characters in the character string acquired by the acquisition unit 102. The sequence generating unit 106 then calculates a difference sequence for the sequence showing the position information of the insignificant characters to generate a sequence whose items are numbers corresponding to the character string lengths of the units.

In more detail for the example given above, the sequence generating unit 106 converts values showing the positions of zeros in the analysis result below that is inputted from the analysis unit 104 to a sequence.
00111101111111111011111110111110111111111011 1111111101111011111110
That is, ordinal numbers are assigned in order with the first position set as the zero position, and a sequence is generated with the ordinal values assigned to the elements composed of zeros as items in the sequence. When the analysis result for the above example is converted to a sequence, the sequence given below is produced.

{0, 1, 6, 18, 26, 33, 44, 55, 60, 68}

After this, the sequence generating unit 106 calculates a difference sequence for the sequence obtained from the values showing the positions of the zeros. The difference sequence for the above example is given below.
{1, 5, 12, 8, 7, 11, 11, 5, 8}

The values included in the obtained difference sequence in reality do not match the character string lengths of the units obtained by dividing the character string in the field. For example, the fourth value "8" in the example difference sequence given above corresponds to "MaryLou". The actual character string length of the unit expressed as "MaryLou" is 7. While it would obviously be possible to subtract one from each value obtained by calculating the difference sequence to set the results at the character string lengths, the values given above are used because what matters here are not the values of the character string lengths themselves but the degree of variance exhibited by the magnitudes of such values. The values obtained by calculating the difference sequence are values that increase and decrease in accordance with the character strings of the units.

The character string length of a unit is the number of consecutive ones in the analysis result given above. Accordingly, to obtain a sequence corresponding to the character string lengths of units, it would be possible to count the number of consecutive ones. However, since the method according to the present embodiment that generates a sequence from values showing the positions of zeros and calculates a difference sequence for the generated sequence can be implemented by simple computation, there is the effect of a high processing speed.

The variance value calculating unit 108 has a function that calculates, for each field, a variance value showing the degree of variance for the magnitudes of the values of the respective items in the sequence generated by the array generating unit 106 corresponding to the character string lengths of the units. That is, the variance value calculating unit 108 calculates a variance value showing the degree of variance in the magnitudes of the respective character string lengths of a plurality of units produced by dividing the character string included in a field specified by the acquisition unit 102 in accordance with the analysis result of the analysis unit 104. The variance value may be any value that shows the degree of variance in the magnitudes of the values, but in the present embodiment, a commonly used standard deviation σ is calculated using Equation (1) below. Here, n is the total number of items in the difference sequence, $\chi_i$ is the $i^{th}$ element in the difference sequence, and $\overline{\chi\chi}$ is the average of $\chi_i$ for i=1 to n.

$$\sigma^2 = \frac{1}{n}\Sigma(\chi_i - \overline{\chi})^2$$

Equation (1)

The specifying unit 110 has a function for specifying, based on the variance values calculated by the variance value calculating unit 108, a cast member field, in which cast member names are listed, from a plurality of fields associated with a single program. The specifying unit 110 specifies a lowest variance value which is the lowest value out of the variance values calculated for each field and specifies the field with the lowest variance value as the cast member field.

That is, the specifying unit 110 specifies a field with little variance in the character string lengths of the units produced by dividing the character string included in the field (i.e., a field composed of units with substantially the same length) as the cast member field. In many cases, the cast member field is composed of a list of cast member names punctuated by commas. This means that the character string lengths of the units in the cast member field will have a high probability of being values corresponding to character string lengths of cast member names. Cast member names have an extremely high probability of having character string lengths within a certain range. For example, in the case of Japanese names, there is an extremely high probability of the names being in a range of around 2 to 8 Japanese characters. This means that the variance value for character string lengths of units obtained by dividing the cast member field will be small compared to other fields (for example, text describing the program content). The information processing apparatus 100 according to the first embodiment of the present invention specifies the cast member field using this property of the cast member field.

Example Operation

Figure 2:
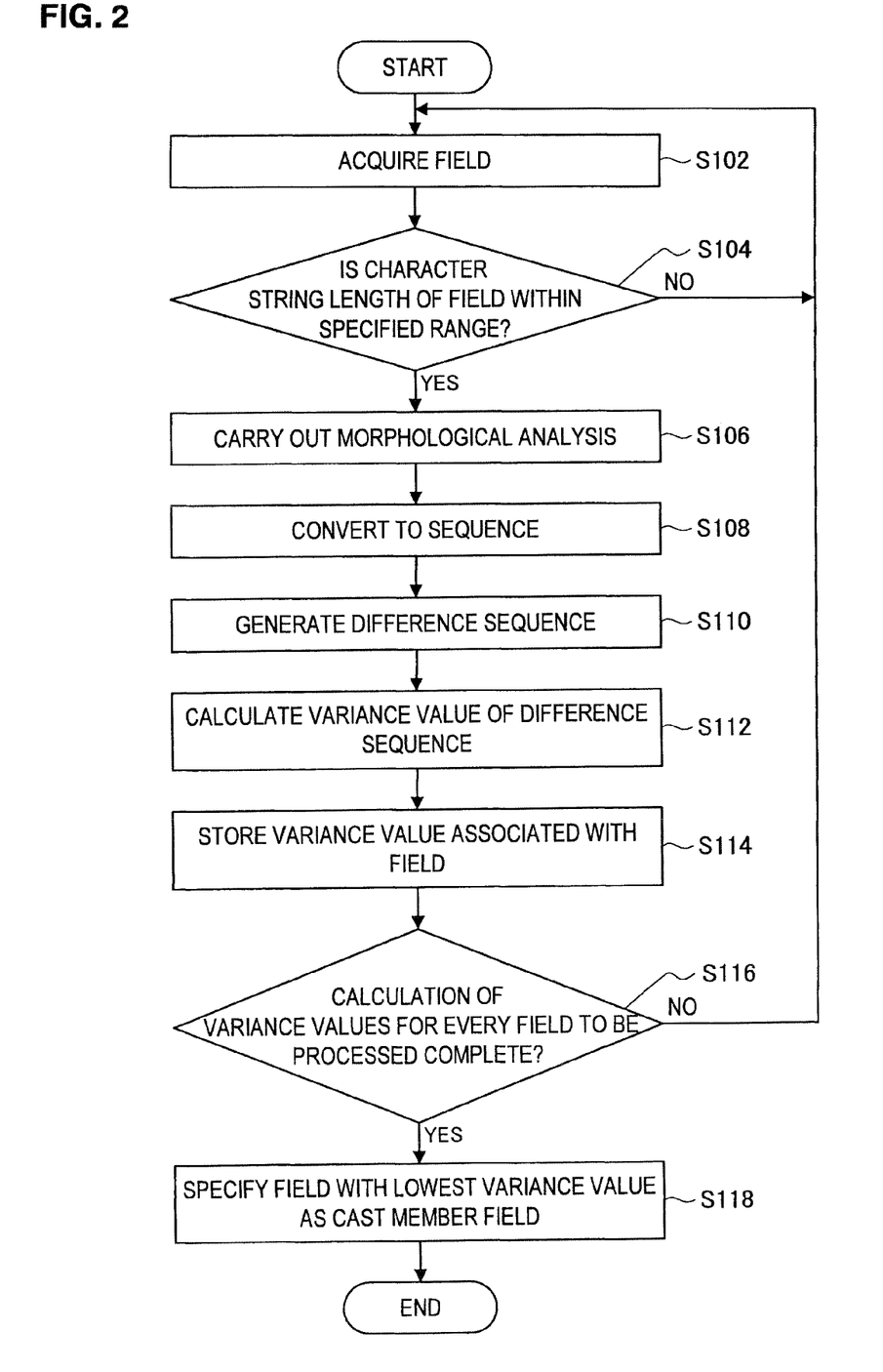
FIG. 2 is a flowchart showing the operation of the information processing apparatus according to the first embodiment.
Figure 3:
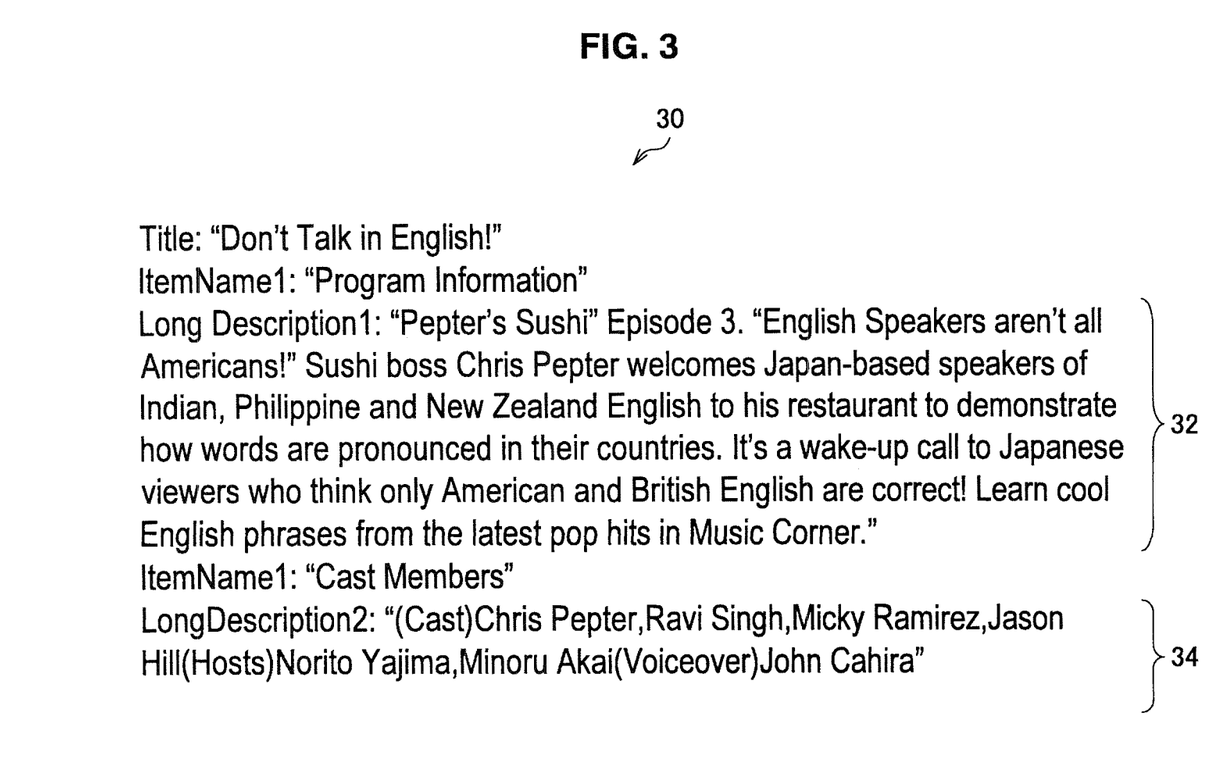
FIG. 3 is a diagram showing an example of program information included in EPG information.

The operation of the information processing apparatus according to the present embodiment will now be described with reference to FIG. 2. FIG. 2 is a flowchart showing a cast member field specifying operation carried out by the information processing apparatus according to the first embodiment of the present invention. Note that the operation of the information processing apparatus is described below for the example program information given in FIG. 3. FIG. 3 is a diagram useful in explaining one example of program information included in EPG information.

The program information 30 shown in FIG. 3 includes a program title, "LongDescription1" that is a first field 32 in which the content of the program is written, and "LongDescription2" that is a second field 34 in which cast information is written.

The method by which the information processing apparatus 100 specifies the cast member field from the program information 30 of a program called "Don't Talk in English!" is described below. First, the acquisition unit 102 of the information processing apparatus 100 successively specifies the fields to be processed from the plurality of fields included in the program information 30 in the EPG information starting from the field closest to the start. In this example, the first field 32 is specified first. The acquisition unit 102 then acquires the character string included in the specified field (S102). In the present example, the acquired character string is "Pepter's Sushi Episode 3. "English Speakers aren't all Americans!" Sushi boss Chris Pepter welcomes Japan-based speakers of Indian, Philippine and New Zealand English to his restaurant to demonstrate how words are pronounced in their countries. It's a wake-up call to Japanese viewers who think only American and British English are correct! Learn cool English phrases from the latest pop hits in Music Corner."

After this, the acquisition unit 102 judges whether the character string length of the acquired field is within a specified field length range (S104). Here, it is assumed that the field length range is set at 1 to 1000 characters. The acquisition unit 102 compares the character string length of the acquired field with the field length range, and since in the present example, the character string length of the acquired field is within the specified field length range, the acquisition unit 102 inputs the character string included in the acquired first field 32 into the analysis unit 104. Meanwhile, if the judgment in step S104 finds that the character string length of the acquired field is not within the specified field length range, the acquisition unit 102 does not input the character string included in the acquired field into the analysis unit 104, and instead returns to step S102 to acquire the next field.

On receiving the input of a character string included in a field from the acquisition unit 102, the analysis unit 104 carries out morphological analysis on the inputted character string and classifies the respective characters into significant characters and insignificant characters (S106). The analysis unit 104 inputs an analysis result that is the classification result in step S106 into the sequence generating unit 106. Since the analysis process by the analysis unit 104 has been described in detail above, no further explanation is given here.

The sequence generating unit 106 generates a sequence corresponding to the character string lengths of units based on the analysis result inputted from the analysis unit 104. More specifically, the sequence generating unit 106 first generates a sequence composed of numbers expressing position information of zeros in the analysis result (a sequence in which significant characters and insignificant characters are classified into ones and zeros, respectively) inputted from the analysis unit 104 (S108). The sequence generated by the present example is as follows.

{0, 7, 22, 23, 43, 57, 58, 114, 210, 213, 290, 347, 348}

The sequence generating unit 106 calculates a difference sequence for the sequence composed of numbers expressing the position information of the zeros (S110). The sequence generating unit 106 inputs the generated sequence corresponding to the character string lengths of the units into the variance value calculating unit 108. The difference sequence LD1$i$ generated here for LongDescription1 is shown below.
LD1$i$={7, 15, 1, 20, 14, 1, 56, 96, 3, 77, 57, 1}

Next, the variance value calculating unit 108 calculates the variance value $\sigma_{LD1}$ of the difference sequence LD1$_i$ (S112). The average of the values of the items in the difference sequence LD1$_i$ is calculated as 29. The total number of items n in the difference sequence LD1$_i$ is 12. The variation value is calculated using these values according to Equation 2 below.

$$\sigma_{LD1}^2 = \frac{\Sigma(LD1_i - 29)^2}{12} = 1026.7 \qquad \text{Equation 2}$$

The variance value calculating unit 108 stores the variance value calculated in step S112 in association with the field in a memory unit 112, for example (S114). The variance value calculating unit 108 then informs the specifying unit 110 that the calculation of the variance value has ended.

When information showing that the calculation of the variance value has ended is inputted from the variance value calculating unit 108, the specifying unit 110 judges whether the calculation process for variance values has been completed for every field to be processed (S116). As one example, the specifying unit 110 may make this judgment by enquiring to the acquisition unit 102 as to whether there is a next field to be processed. In the present example, since the second field 34 (see FIG. 3) exists as a next field to be processed, the specifying unit 110 does not carry out the process specifying the cast member field and the processing instead returns to the field acquiring process in step S102.

The acquisition unit 102 next acquires the character string
"(Cast)Chris Pepter,Ravi Singh,Micky Ramirez,Jason Hill (Hosts)Norito Yajima,Minoru Akai(Voiceover)John Cahira"
included in the second field 34. After this, the processing in step S104 to step S114 is carried out in the same way on the acquired character string.

Since the detailed processing content is the same as for the processing described above, no further explanation is given here. Once the processing up to step S110 has been carried out, the difference sequence LD2$i$ for the second field 34 is found as follows.

LD2$i$={1, 5, 12, 10, 13, 10, 6, 13, 11, 10, 11}

In step S112, the variance value $\sigma_{LD2}$ for the difference sequence LD2$_i$ is found as shown below using the same procedure.

$$\sigma^2_{LD2} = \frac{\Sigma(LD2_i - 9.3)^2}{11} = 12.7 \quad \text{Equation 3}$$

The variance value calculating unit 108 stores the variance value $\sigma_{LD2}$ calculated according to Equation 3 above in association with the field in the memory unit 112. The variance value calculating unit 108 then informs the specifying unit 110 that the calculation of the variance value has ended.

The specifying unit 110 again judges whether the calculation process for variance values has been completed for every field to be processed (S116). Since the program information used in the present example includes two fields to be processed, at this time there is no next field to be processed. Accordingly, the specifying unit 110 next carries out the process specifying the cast member field.

The specifying unit 110 first refers to the variance values stored in the memory unit 112. In the present example, the specifying unit 110 can refer to two variance values $\sigma_{LD1}^2$=1026.7 and $\sigma_{LD2}^2$=12.7. The specifying unit 110 specifies the field associated with the lowest variance value out of such variance values as the cast member field. In this case, since $\sigma_{LD1}$>$\sigma_{LD2}$, the specifying unit 110 specifies that the second field 34 is the cast member field.

Example Effects

The configuration and operation of the information processing apparatus 100 according to the first embodiment of the present invention have been described above. According to the above configuration, the information processing apparatus 100 is capable of specifying a cast member field in which cast member names are listed from a plurality of fields included in program information, which is information about a program in EPG information. When doing so, a sequence corresponding to character string lengths of units produced by dividing the character string included in a field is generated and the field with the lowest variance value for the values of the items in such sequence is specified as the cast member field. Unlike an existing method of specifying the cast member field, this method of specifying has an effect in that it is possible to specify the cast member field without using a priori knowledge. Also, when the existing method of specifying the cast member field by matching against a priori knowledge is used, if a list of cast members is given in a plurality of fields, all of such fields will be extracted. For example, when a list of cast members is included in the text of a program summary field in the program information and a separate cast member field is included in the program information, the existing method will extract both of such fields. On the other hand, the information processing apparatus 100 according to the present embodiment is able to specify the field out of such fields with the lowest variance value as a single cast member field.

In addition, in the process that generates a sequence corresponding to the character string lengths of the units produced by dividing the character string included in a field, the information processing apparatus 100 according to the present embodiment generates the sequence corresponding to the character string lengths of the units in the field by classifying individual characters included in the character string into significant characters and insignificant characters and calculating a difference sequence for such sequence using the positions of the insignificant characters as coordinates. By using this configuration, compared to when using a method that directly counts the character string length of each unit, it is possible to carry out processing at high speed.

The information processing apparatus 100 according to the present embodiment judges whether the size of the character string obtained from a field is within a specified field length range and when the size of the character string included in the field is not within the field length range, does not subject such field to analysis. By using this configuration, when it is clear from the size of the character string included in a field that the field is too long to be the cast member field, such field can be excluded from processing. The time taken by a process that judges the size of the character string included in a field is clearly shorter than the time taken by a process that analyzes the content of a character string. This means that by using the above configuration, it is possible to reduce the time that would be wasted by analysis of fields that can be clearly judged to not be a cast member field based on the size of the character string included in the field.

Second Embodiment

Functional Configuration

Figure 4:
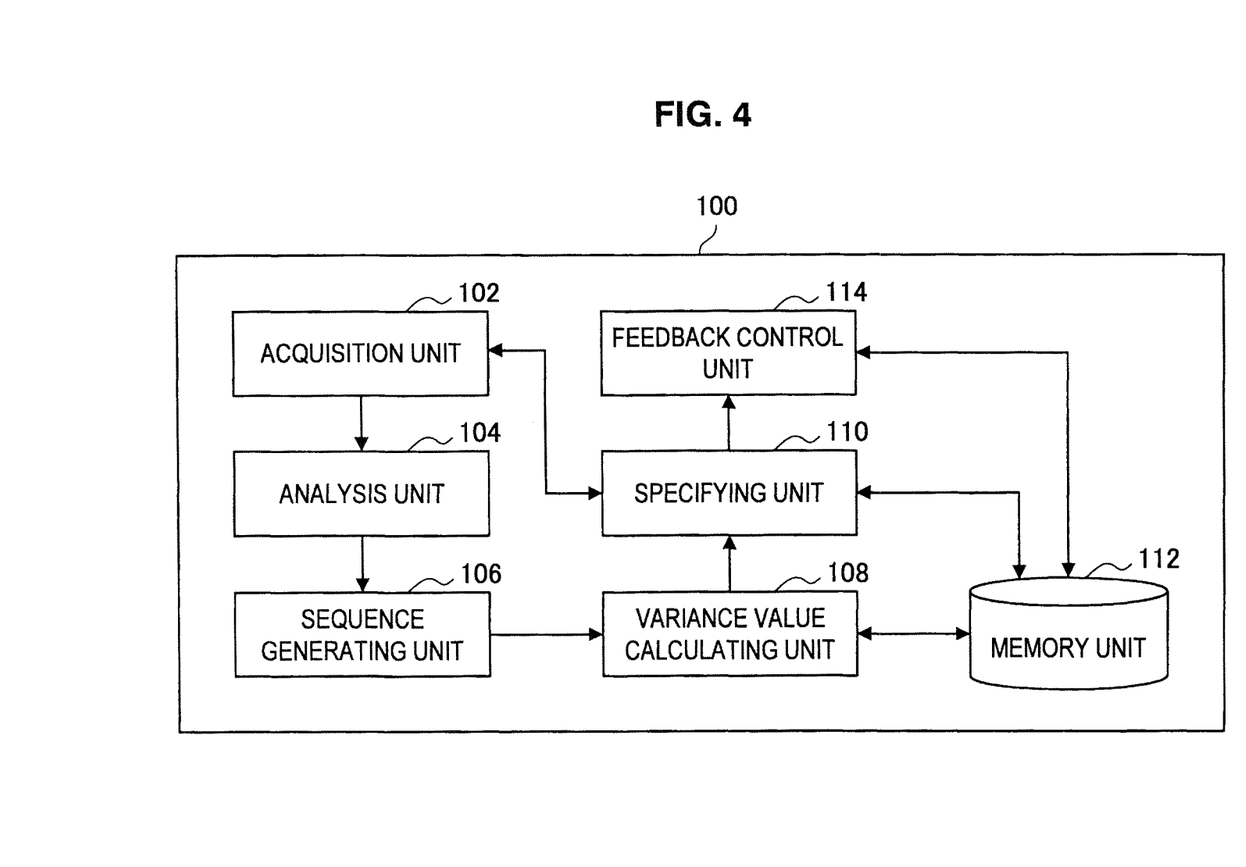
FIG. 4 is a functional block diagram showing an information processing apparatus according to a second embodiment of the present invention.

Next, the functional configuration of the information processing apparatus 100 according to a second embodiment of the present invention will be described with reference to FIG. 4. FIG. 4 is a functional block diagram showing the configuration of an information processing apparatus according to the second embodiment of the present invention.

In the same way as the information processing apparatus 100 according to the first embodiment, the information processing apparatus 100 according to the second embodiment of the present invention includes a function for specifying a cast member field based on a variance value of character string lengths of units produced by dividing the character string included in a field. However, since the information processing apparatus 100 according to the first embodiment specifies the field with the lowest variance value obtained by analyzing fields as the cast member field, the field with the lowest variance value out of the program information will be specified as a cast member field even when program information that does not include a cast member field has been inputted. For this reason, the information processing apparatus according to the second embodiment provides an improved function for specifying a cast member field that is capable, when program information that does not include a cast member field has been inputted, of specifying that no cast member field is present.

To provide the function mentioned above, the information processing apparatus 100 according to the present embodiment includes the acquisition unit 102, the analysis unit 104, the sequence generating unit 106, the variance value calculating unit 108, the specifying unit 110, the memory unit 112, and a feedback control unit 114.

Since the functions of the acquisition unit 102, the analysis unit 104, the sequence generating unit 106, and the variance value calculating unit 108 are the same as in the first embodiment, description thereof is omitted here. The present embodiment will now be described focusing on the differences with the first embodiment.

The specifying unit 110 in the present embodiment specifies the lowest variance value that is the lowest of the variance values calculated by the variance value calculating unit 108 for each field. The specifying unit 110 then compares the value of the specified lowest variance value with the value of a specified judgment threshold $\alpha$, and specifies that the field with the lowest variance value is a cast member field if the lowest variance value is below the judgment threshold. Meanwhile, if the lowest variance value is greater than the judgment threshold, the specifying unit 110 recognizes that there is no cast member field in the program information. If the inputted program information does not include a cast member field, there is a high probability that the variance values for every field will be high values compared to the variance value obtained from a cast member field. However, in some cases, the specifying unit 110 of the information processing apparatus 100 according to the first embodiment of the present invention will mistake the field with the lowest variance value out of such fields for a cast member field. For this reason, the specifying unit 110 according to the present embodiment sets a judgment threshold $\alpha$ in advance and if the lowest variance value is lower than the value of such judgment threshold, specifies that the field with the lowest variance value is a cast member field. That is, the value a of the judgment threshold is decided based on a value that can be taken by the variance value of a cast member field.

On specifying a cast member field, in which cast member names are listed, from the plurality of fields included in program information, the specifying unit 110 calculates an average of the values included in a sequence corresponding to the field specified as the cast member field out of the sequences generated by the sequence generating unit 106 as a cast member name average length and stores the cast member name average length in the memory unit 112. As one example, the cast member name average length may be calculated and updated whenever the specifying unit 110 has successfully specified a cast member field. The specifying unit 110 is also capable of specifying the cast member field based on the stored cast member name average length. For example, the specifying unit 110 sets, based on the stored cast member name average length, a range of values that can be taken by cast member names. As one example, the range of values that can be taken by the cast member names may be within double the cast member name average length. Also, if the values of every item in the sequence corresponding to a field are within the range set as the range of values that can be taken by the cast member names, such field may be specified as a cast member field.

When the process specifying the cast member field using the processing described above has ended, the specifying unit 110 outputs success/failure information showing whether the specifying of a cast member field succeeded to the feedback control unit 114.

The feedback control unit 114 has a function that adjusts the value of the judgment threshold $\alpha$ based on the success/failure information inputted from the specifying unit 110. The feedback control unit 114 uses a success value whose value is incremented when the success/failure information inputted from the specifying unit 110 shows that the specifying of the cast member field succeeded and a failure value whose value is incremented when the success/failure information inputted from the specifying unit 110 shows that the specifying of the cast member field failed and adjusts the value of the judgment threshold $\alpha$ when the success value exceeds a specified success threshold and when the failure value exceeds a specified failure threshold.

When the success value exceeds the specified success threshold, the feedback control unit 114 reduces the value of the judgment threshold $\alpha$. For example, a specified adjustment value may be subtracted from $\alpha$. That is, when the success value exceeds the success threshold, the variance value condition used as a standard when judging whether a field is a cast member field is changed so as to become stricter. Also, when the failure value exceeds the specified failure threshold, the feedback control unit 114 increases the value of the judgment threshold $\alpha$. For example, a specified adjustment value may be added to $\alpha$. That is, when the failure value exceeds the failure threshold, the variance value condition used as a standard when judging whether a field is a cast member field is changed so as to become less strict.

Example Operation

Figure 5:
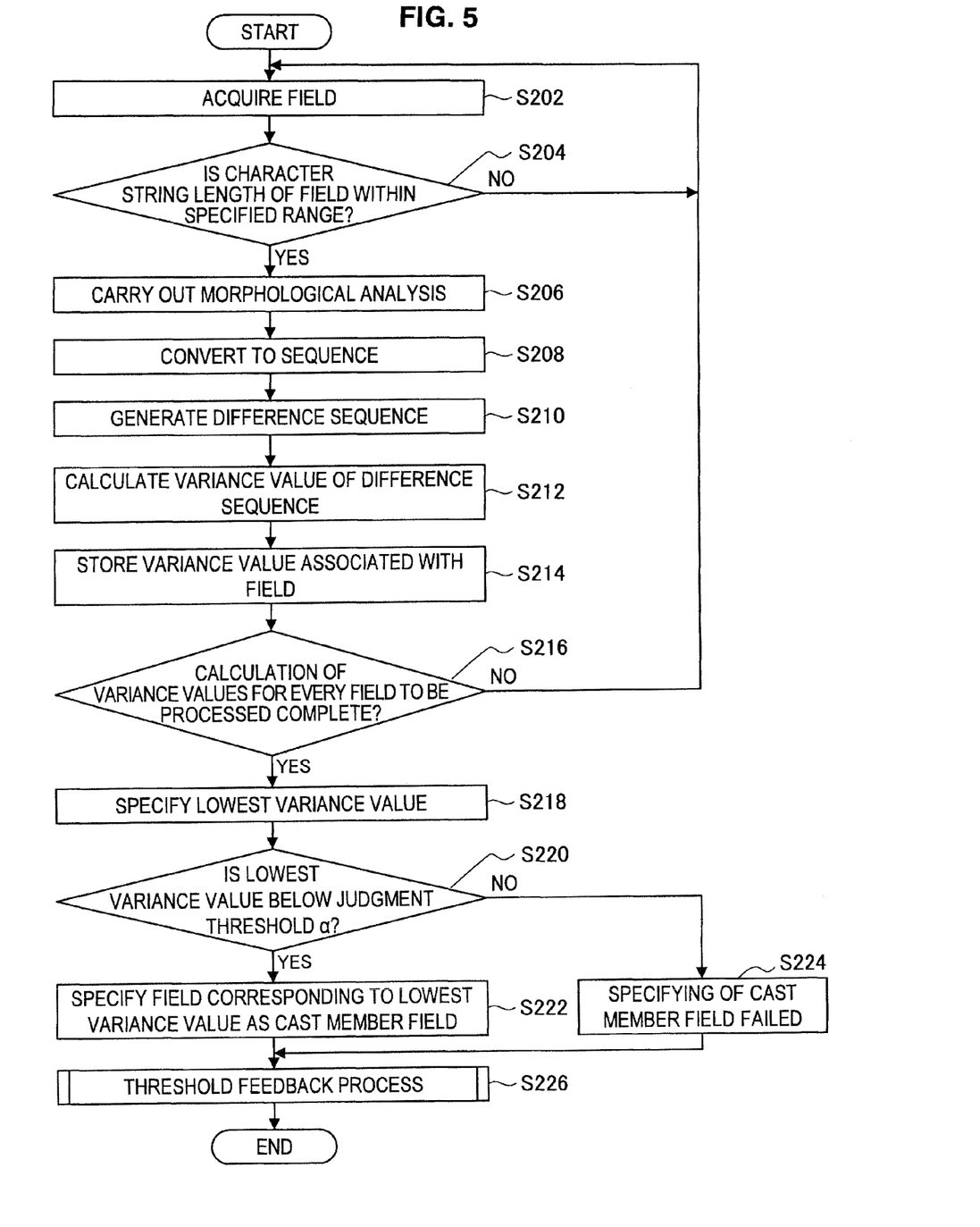
FIG. 5 is a flowchart showing the operation of the information processing apparatus according to the second embodiment.
Figure 6:
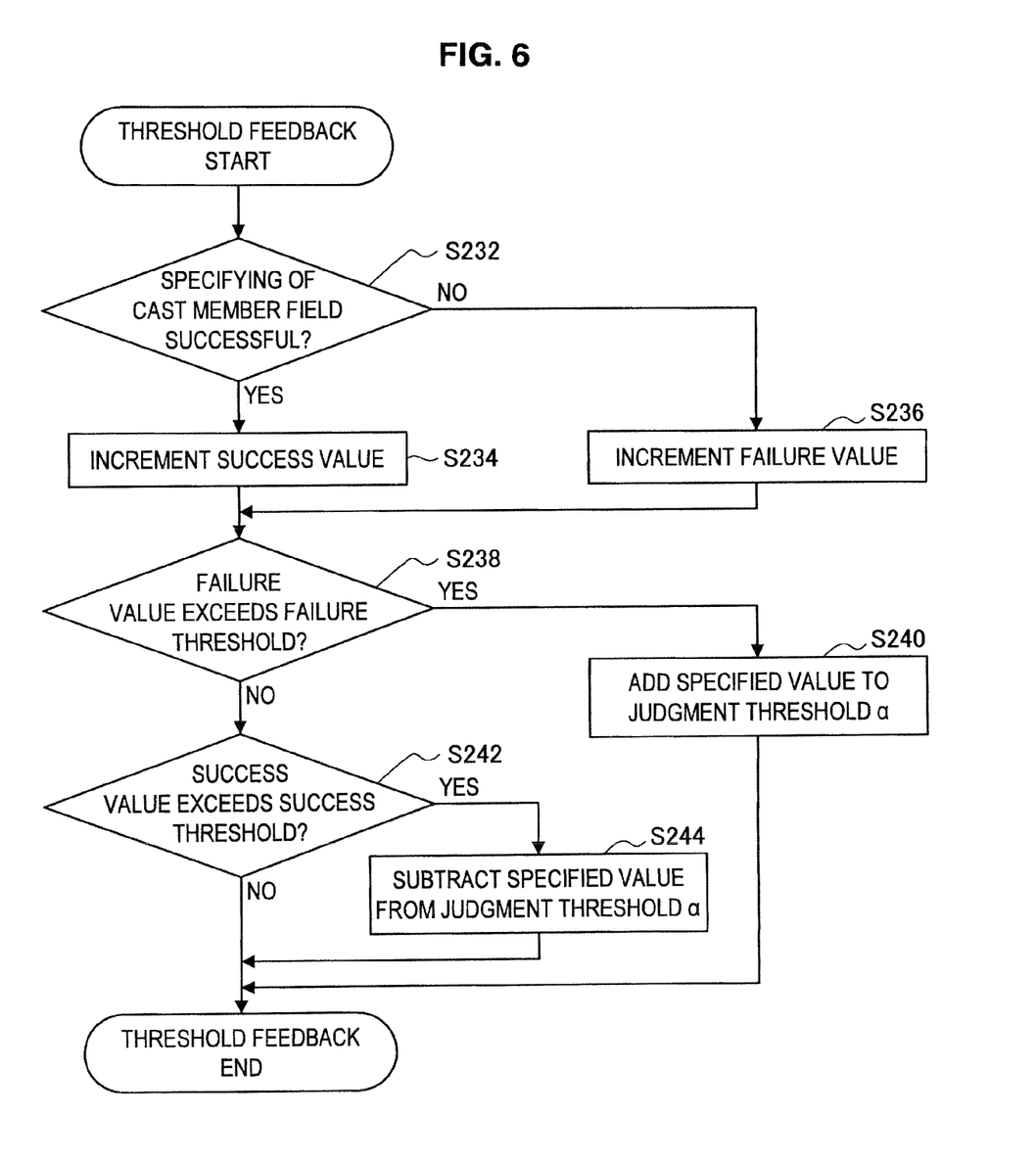
FIG. 6 is a flowchart showing the operation of a feedback process of the information processing apparatus according to the second embodiment.

The operation of the information processing apparatus according to the second embodiment of the present invention will now be described with reference to FIGS. 5 and 6. FIG. 5 is a flowchart showing a cast member field specifying operation carried out by the information processing apparatus according to the second embodiment of the present invention. FIG. 6 is a sub-flowchart showing the detailed operation of a threshold feedback process in FIG. 5.

Since the processing from step S202 to step S216 in FIG. 5 is the same as the processing in step S102 to step S116 of the first embodiment shown in FIG. 2, description thereof is omitted here.

If, in the judgment in step S216, the specifying unit 110 judges that the process calculating variance values has been completed for every field to be processed, the specifying unit 110 first refers to the variance values stored in the memory unit 112 and specifies the lowest variance value which is the lowest value out of the stored variance values (S218). The specifying unit 110 then judges whether the specified lowest variance value is lower than the specified judgment threshold $\alpha$ (S220).

If it has been judged in the judgment in step S220 that the lowest variance value is below the judgment threshold $\alpha$, the specifying unit 110 judges that the field corresponding to the lowest variance value is a cast member field (S222). Here, although not shown, the specifying unit 110 may also judge whether the values of the items in the sequence corresponding to the field with the lowest variance value are within a range based on the cast member name average length calculated in advance and specify that the field corresponding to the lowest variance value is the cast member field when all of such values are judged to be within the range. On specifying the cast member field, the specifying unit 110 generates success/failure information showing that the specifying of the cast member field succeeded and inputs the success/failure information into the feedback control unit 114.

Meanwhile, if it has been judged in the judgment in step S220 that the lowest variance value is equal to or above the judgment threshold $\alpha$, the specifying unit 110 generates success/failure information showing that the specifying of the cast member field failed and inputs the success/failure information into the feedback control unit 114.

Once the specifying unit 110 has inputted the success/failure information into the feedback control unit 114, the threshold feedback process is carried out (S226). The detailed operation of the threshold feedback process will now be described with reference to FIG. 6.

First, the feedback control unit 114 judges whether the specifying of the cast member field succeeded based on the success/failure information inputted from the specifying unit 110 (S232). If the success/failure information inputted from the specifying unit 110 shows that the specifying of the cast member field succeeded, the feedback control unit 114 increments the success value (S234). Meanwhile, if the success/failure information inputted from the specifying unit 110 shows that the specifying of the cast member field failed, the feedback control unit 114 increments the failure value (S236).

After reflecting the success/failure information on the specifying of the cast member field in the success value or the failure value in this way, the feedback control unit 114 judges whether the failure value exceeds the failure threshold (S238). If, in the judgment in step S238, it is judged that the failure value exceeds the failure threshold, the feedback control unit 114 increases the judgment threshold $\alpha$ by a specified value (S240). Meanwhile, if, in the judgment in step S238, it is judged that the failure value does not exceed the failure threshold, the feedback control unit 114 next judges whether the success value exceeds the success threshold (S242). If, in the judgment in step S242, it is judged that the success value exceeds the success threshold, the feedback control unit 114 decreases the judgment threshold $\alpha$ by a specified value (S244). Meanwhile, if, in the judgment in step S242, it is judged that the success value does not exceed the success threshold, the feedback control unit 114 ends the threshold feedback process.

Example Effects

The configuration and operation of an information processing apparatus 100 according to the second embodiment of the present invention have been described above. According to this configuration, the information processing apparatus 100 is capable of achieving the effects described below in addition to the effects described earlier in the first embodiment.

First, in the information processing apparatus 100 according to the present embodiment, the specifying unit 110 uses the specified judgment threshold $\alpha$ to judge whether a field with a variance value that is lower than the judgment threshold is present. When no field with a variance value lower than the judgment threshold is present, the specifying unit 110 judges that no field that corresponds to a cast member field is present. By using this configuration, when the program information does not include a cast member field, it is possible to reduce the probability of a field that is not a cast member field being mistaken for a cast member field.

In addition, the specifying unit 110 outputs success/failure information showing whether the specifying of the cast member field succeeded and the feedback control unit 114 adjusts the value of the judgment threshold $\alpha$ based on the success/failure information. For example, if the specifying of the cast member field fails consecutively, regardless of whether a cast member field is actually included in the program information in question, there is the possibility that the specifying of the cast member field is failing due to the value of the judgment threshold $\alpha$ not being appropriate. However, with the present configuration, it is possible to dynamically adjust the judgment threshold $\alpha$ based on specific success/failure information.

On specifying a cast member field, the specifying unit 110 calculates and stores a cast member name average length that is a value corresponding to the average length of the cast member names included in the specified cast member field. The specifying unit 110 is then capable of specifying a cast member field based on this value. By using this configuration, it is possible when a field in which character strings with substantially the same character string length are listed but which is not a cast member field is present in the program information, to reduce the probability of such field being mistakenly judged to be a cast member field. In other words, there is an effect in that the ability to specify a cast member field is improved.

Compared to the existing method that needs to carry out matching against a priori knowledge, the method of the present embodiment that uses the variance value of character string lengths of each unit generated by dividing the character string length in a field has an effect wherein the same method can be used for many different languages. A priori knowledge can differ between languages and even between countries for the same language, which means that the a priori knowledge used in each situation needs to be investigated. However, although the character string lengths of cast member names and the degree of variance thereof will differ from language to language, the property that the variance value of the cast member field is low compared to the variance values of other fields is shared between languages. This produces an effect in that it is not necessary to investigate a priori knowledge for each language or for each country. Although the judgment threshold and cast member name average length used in the present embodiment have a high probability of differing between languages, the information processing apparatus 100 according to the present embodiment has a configuration that automatically adjusts such values, which means that it is not necessary for the developer or the user to adjust such values.

Note that the functions of the respective units of the information processing apparatus 100 described in the first and second embodiments given above are achieved in reality by a computational device such as a CPU (Central Processing Unit), not shown, reading a control program in which processing procedures for realizing the various functions are written from a storage medium such as a ROM (Read Only Memory) or RAM (Random Access Memory) that stores the control program, and interpreting and executing the control program. For example, in the information processing apparatus 100 according to the first and second embodiments described above, the respective functions of the acquisition unit 102, the analysis unit 104, the sequence generating unit 106, the variance value calculating unit 108, the specifying unit 110, and the feedback control unit 114 are achieved in reality by a CPU carrying out a program in which processing procedures for realizing such functions are written.

Although preferred embodiments of the present invention have been described in detail with reference to the attached drawings, the present invention is not limited to the above examples. It should be understood by those skilled in the art that various modifications, combinations, sub-combinations and alterations may occur depending on design requirements and other factors insofar as they are within the scope of the appended claims or the equivalents thereof.

For example, although a list of the characters regarded as insignificant characters is decided in advance and the analysis unit 104 defines that characters aside from the insignificant characters are significant characters in the first and second embodiments described above, the present invention is not limited to the examples given. As examples, Chinese characters, Japanese Kana, numerals, and letters of the alphabet may be defined as significant characters and characters aside from such significant characters may be defined as insignificant characters.

Also, although the variance value calculating unit 108 uses a standard deviation as a value showing the degree of variance of values in the first and second embodiments described above, the present invention is not limited to this example. As another example, the variance value may be an index showing the degree of variance of values, such as the range or interquartile range of the values.

Also, although the feedback control unit 114 adds a specified adjustment value to α or subtracts a specified adjustment value from α to adjust the value of the judgment threshold α in the second embodiment described above, the present invention is not limited to this example. For example, the feedback control unit 114 may adjust the value of the judgment threshold α by multiplying the judgment threshold by a specified adjustment value or dividing the judgment threshold by a specified adjustment value.

Also, although the feedback control unit 114 adjusts the value of the judgment threshold α when the success value exceeds the success threshold or when the failure value exceeds the failure threshold based on the success/failure information, the present invention is not limited to this example. For example, the value of the judgment threshold may be adjusted when the specifying of the cast member field has succeeded consecutively for a set number of times or more or when the specifying of the cast member field has failed consecutively for a set number of times or more.

Note that in the present specification the steps written in the flowcharts include processes that are carried out in the written order in a time series, but do not need to be carried out in a time series and may be carried out in parallel or individually. It should also be obvious that the order of the steps carried out in a time series may be changed as appropriate depending on the situation.

The present application contains subject matter related to that disclosed in Japanese Priority Patent Application JP 2010-021370 filed in the Japan Patent Office on Feb. 2, 2010 (e.g. Oct. 22, 2008), the entire content of which is hereby incorporated by reference.

What is claimed is:

1. An information processing apparatus comprising:
   a computational device including
      an acquisition unit successively specifying fields to be processed out of a plurality of fields included in program information in electronic program guide information and acquiring a character string included in each specified field;
      an analysis unit analyzing the character string acquired by the acquisition unit and outputting an analysis result for dividing the character string into a plurality of units;
      a sequence generating unit generating, for each field, a sequence corresponding to character string lengths of the units based on the analysis result outputted by the analysis unit;
      a variance value calculating unit calculating, for each field, a variance value showing a degree of variance of magnitudes of values of items in the sequence; and
      a specifying unit specifying, for each program, a cast member field, in which cast member names are listed, out of the plurality of fields based on the variance values calculated by the variance value calculating unit.

2. An information processing apparatus according to claim 1,
   wherein the analysis unit analyzes the character string acquired by the acquisition unit, classifies the respective characters included in the character string in accordance with a specified classification criterion into significant characters and insignificant characters, and outputs a classification result as the analysis result, and
   the sequence generating unit calculates a difference sequence for a sequence showing position information of the insignificant characters in the character string using the analysis result to generate the sequence corresponding to the character string lengths of the units.

3. An information processing apparatus according to claim 1,
   wherein the acquisition unit judges whether the size of the character string acquired from a field is within a specified field length range and is operable when the length is within the field length range, to input the character string acquired from the field into the analysis unit.

4. An information processing apparatus according to claim 1,
   wherein the specifying unit specifies a lowest variance value that is a lowest value out of the variance values calculated for each field and specifies a field with the lowest variance value as the cast member field.

5. An information processing apparatus according to claim 1,
   wherein the specifying unit specifies a lowest variance value that is a lowest value out of the variance values calculated for each field and is operable when the lowest variance value is below a specified judgment threshold, to specify a field with the lowest variance value as the cast member field.

6. An information processing apparatus according to claim 5,
   wherein the specifying unit outputs success/failure information showing whether specifying of the cast member field succeeded, and
   the information processing apparatus further comprises a feedback control unit adjusting the value of the judgment threshold based on, the success/failure information outputted by the specifying unit.

7. An information processing apparatus according to claim 1,
   wherein after specifying the east member field, in which cast member names are listed, out of the plurality of fields, the specifying unit calculates and stores a cast member name average length that is to average of the values included in the sequence of the field specified as the cast member field, aid specifies the cast member field based on the stored cast member name average length.

8. An information processing method for an information processing apparatus having a computational device that specifies a cast member field, in which cast member names are listed, from a plurality of fields included in program information in electronic program guide information, comprising the steps of:
   successively specifying fields to be processed out of a plurality of fields included in the program information in the electronic program guide information and acquiring a character string included it each specified field;
   analyzing the acquired character string and outputting an analysis result for dividing the character string into a plurality of units;
   generating, for each field, a sequence corresponding to character string lengths of the units based on the outputted analysis result;
   calculating, for each field, a variance value showing a degree of variance of magnitudes of values of items in the sequence; and specifying, for each program, a cast member field, in which cast member names are listed, out of the plurality of fields based on the variance values.

9. A program embedded on a non-transitory computer-readable medium for causing a computer to carry out:
- a process successively specifying fields to be processed out of a plurality of fields included in the program information in the electronic program guide information and acquiring a character string included in each specified field;
- a process analyzing the acquired character string and outputting an analysis result for dividing the character string into a plurality of units;
- a process generating, for each field, a sequence corresponding to character string lengths of the units based on the outputted analysis result;
- a process calculating, for each field, a variance value showing a degree of variance of magnitudes of values of items in the sequence; and
- a process specifying, for each program, a cast member field, in which cast member names are listed, out of the plurality of fields based on the variance values.

* * * * *